(12) United States Patent
Funatsu

(10) Patent No.: US 8,675,228 B2
(45) Date of Patent: Mar. 18, 2014

(54) INFORMATION PROCESSING SYSTEM, INFORMATION PROCESSING APPARATUS, AND COMPUTER READABLE MEDIUM

(75) Inventor: Shinji Funatsu, Kanagawa (JP)

(73) Assignee: Fuji Xerox Co., Ltd., Tokyo (JP)

(*) Notice: Subject to any disclaimer, the term of this patent is extended or adjusted under 35 U.S.C. 154(b) by 411 days.

(21) Appl. No.: 13/030,867

(22) Filed: Feb. 18, 2011

(65) Prior Publication Data

US 2012/0069389 A1    Mar. 22, 2012

(30) Foreign Application Priority Data

Sep. 17, 2010   (JP) .................................. 2010-209009

(51) Int. Cl.
*G06F 3/12*   (2006.01)

(52) U.S. Cl.
USPC ......................................................... 358/1.15

(58) Field of Classification Search
None
See application file for complete search history.

(56) References Cited

U.S. PATENT DOCUMENTS

| | | |
|---|---|---|
| 2002/0120875 A1 | 8/2002 | Kiwada et al. |
| 2003/0030843 A1 | 2/2003 | Qiao |
| 2003/0172308 A1 | 9/2003 | Imai |
| 2006/0061803 A1 | 3/2006 | Oka |
| 2009/0051962 A1* | 2/2009 | Asai et al. .................... 358/1.15 |
| 2011/0043854 A1* | 2/2011 | Sakikawa .................... 358/1.15 |

FOREIGN PATENT DOCUMENTS

| | | |
|---|---|---|
| JP | 2002-251356 A | 9/2002 |
| JP | 2003-58459 A | 2/2003 |
| JP | 2003-323360 A | 11/2003 |
| JP | 2004-104346 A | 4/2004 |
| JP | 2005-115559 A | 4/2005 |
| JP | 2006-85670 A | 3/2006 |
| JP | 2007-094534 A | 4/2007 |

* cited by examiner

*Primary Examiner* — Fan Zhang
(74) *Attorney, Agent, or Firm* — Sughrue Mion, PLLC

(57) ABSTRACT

According to an aspect of the invention, an information processing system includes a control device, an information processing apparatus, a control target device. The information processing apparatus is connected to the control device. The control target device is connected to the information processing apparatus. The control device includes a first unit that receives a first request and transmits a first result of a first processing about the first request to the information processing apparatus. The information processing apparatus includes a second unit that accepts the first request, transmits the first request to the control device, and receives the first result from the control device, and a third unit that determines whether the received first result includes an instruction to request the control target device to perform a processing, and when it is determined that the first result includes the instruction, requests the control target device to perform the processing.

15 Claims, 7 Drawing Sheets

FIG. 5

| NETWORK ADDRESS OF INFORMATION PROCESSING APPARATUS | PRINTER LIST VIEW INFORMATION | | | |
|---|---|---|---|---|
| | NETWORK ADDRESS | NAME OF APPLIANCE | NAME OF KIND OF APPLIANCE | ... |
| aaaa | bbbb | α α α | pppp | ⋮ |
| | cccc | β β β | pppp | ⋮ |
| | ... | ... | ... | ⋮ |
| dddd | eeee | γ γ γ | qqqq | ... |
| | ... | ... | ... | ... |

FIG. 6

| | Name of Appliance ▲ | Name of Host IP Address | Name of Kind of Appliance | Status | |
|---|---|---|---|---|---|
| ☐ | α | 129.249 ... | pppp | ⚠ Charge Paper | ✎ ✕ |
| ☐ | β | 129.249 ... | pppp | ⚠ Charge Paper | ✎ ✕ |
| ☐ | γ | 129.249 ... | qqqq | ⚠ Charge Paper | ✎ ✕ |
| ☐ | δ | 129.249 ... | rrrr | ⚠ Charge Paper | ✎ ✕ |

FIG. 7

APPLIANCE EDIT

| Basic Information | Communication Setting | Surveillance Setting | Pool Server Setting | Collection Setting |

OK  Cancel

IP Address Host Name (Required):
(Example: hostname.example.com.1920: 1.2001 DE8.11111)
129.249. ...

Appliance Name (Required):
kishu

Appliance Name (for Setting) (Required):
ApsosPort-IV C3370 ☑ Acquire from appliance ⟵ (X)

Type: PPPP
Type Code: NC100345
Identification ID: SS0067
Software Version: 1.0.20

Installing Place:
☑ Acquire from appliance ⟵ (X)

Remarks:
☑ Acquire from appliance ⟵ (X)

Function: ☑ Printer  ☑ Copy Machine  ☑ Facsimile  ☑ Scanner

Appliance URL:
http//:

Maker: ⊙ xxxx    ○ Except xxxx

Belonging Appliance Group: yyy
Note: ...

OK  Cancel

INFORMATION PROCESSING SYSTEM, INFORMATION PROCESSING APPARATUS, AND COMPUTER READABLE MEDIUM

CROSS-REFERENCE TO RELATED APPLICATIONS

This application is based upon and claims priority under 35 USC 119 from Japanese Patent Application No. 2010-209009, filed Sep. 17, 2010.

BACKGROUND

Technical Field

The present invention relates to an information processing system, an information processing apparatus, and a computer readable medium.

SUMMARY OF THE INVENTION

According to an aspect of the invention, an information processing system includes a control device, an information processing apparatus, a control target device. The information processing apparatus is connected to the control device through a communication unit that permits a given limited communication. The control target device is connected to the information processing apparatus. The control device includes a first unit that receives a first request from the information processing apparatus and transmits a first result of a first processing about the first request to the information processing apparatus. The information processing apparatus includes a second unit that accepts the first request, transmits the first request to the control device, and receives the first result from the control device, and a third unit that determines whether the received first result includes an instruction to request the control target device to perform a processing, and when it is determined that the first result includes the instruction, requests the control target device to perform the processing.

BRIEF DESCRIPTION OF THE DRAWINGS

Exemplary embodiments of the invention will be described in detail based on the following figures, wherein:

FIG. 5 is an explanatory diagram illustrating an example of information that is maintained by a server device of an information processing system according to an exemplary embodiment of the invention;

FIG. 6 is an explanatory diagram illustrating an example of an interface that is provided by an information processing apparatus according to an exemplary embodiment of the invention; and FIG. 7 is an explanatory diagram illustrating an example of another interface that is provided by an information processing apparatus according to an exemplary embodiment of the invention.

DETAILED DESCRIPTION

Figure 1:
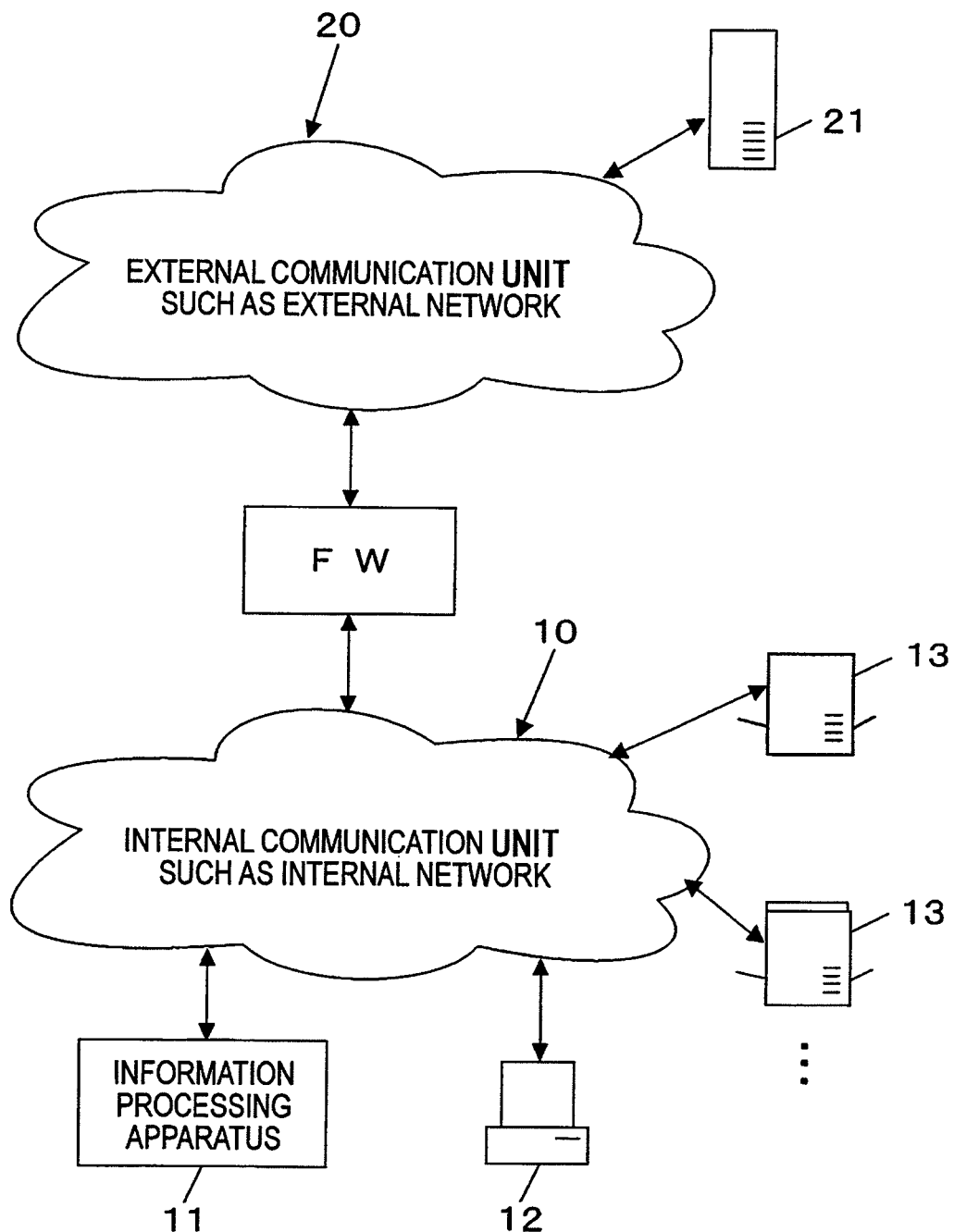
FIG. 1 is a block diagram illustrating an example of an information processing system according to an exemplary embodiment of the invention.

Exemplary embodiments of the invention will be described with reference to the accompanying drawings. An information processing system according to an exemplary embodiment of the invention, as exemplarily illustrated in FIG. 1, is used in an environment that includes an internal network 10 as an internal communication unit, and an external network 20 as an external communication unit such as the Internet. Between the internal network 10 and the external network 20, a network protection unit such as a firewall (FW) is installed to permit only a mutually predetermined limited communication.

The firewall permits only the predetermined limited communication. Specifically, the firewall does not relay an instruction to the internal network 10 so that such an image forming instruction may not be transmitted from a server device 21 on the external network 20 to a device 13 on the internal network 10. Also, the firewall permits an information request from an information processing apparatus on the internal network 10 to the server device 21 and information transmission for the corresponding request from the server device 21 to the information processing apparatus 11. Since the setting of the firewall that permits only the predetermined limited communication is generally known, the detailed explanation thereof will be omitted.

The information processing system according to this exemplary embodiment includes the information processing apparatus 11 connected to the internal network 10, a user side device 12, a device 13, and the server device 21 connected to the external network 20.

Figure 2:
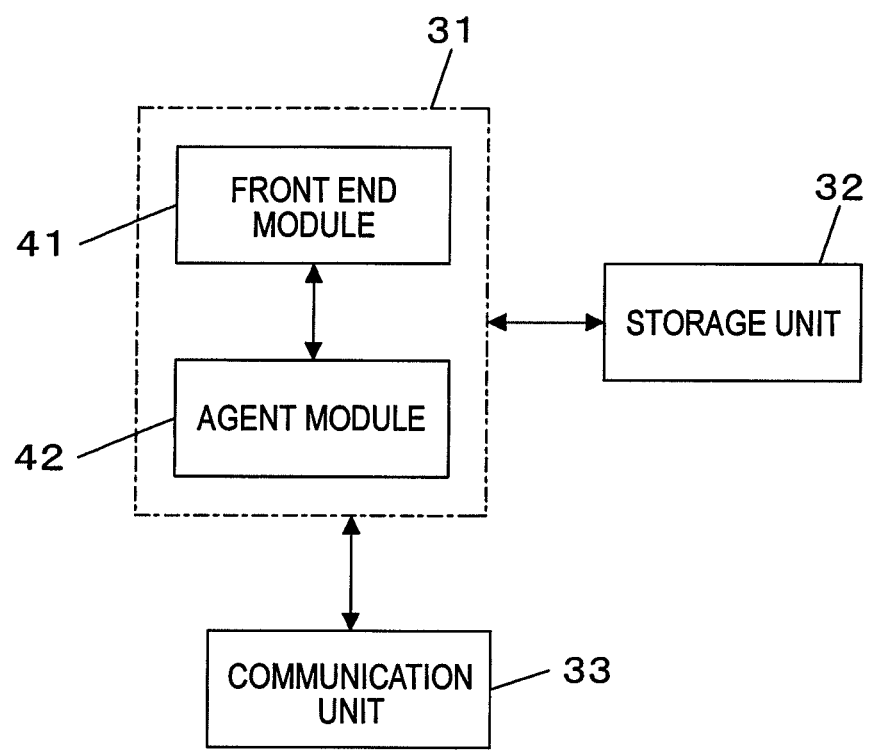
FIG. 2 is a block diagram illustrating the configuration of an example of an information processing apparatus according to an exemplary embodiment of the invention.

Here, the information processing apparatus 11, as illustrated in FIG. 2, includes a control unit 31, a storage unit 32, and a communication unit 33. The control unit 31 is a program control device such as a CPU (Central Processing Unit), and operates in accordance with a program stored in the storage unit 32. In this exemplary embodiment, the control unit 31 performs a process that includes a front end module 41 and an agent module 42. The front end module 41 and the agent module 42 may be program. The front end module 41 of the control unit 31 receives a request from the user side device 12, transmits this request to the connected server device 21 through the external network 20, and executes a predetermined process. Also, the front end module 41 of the control unit 31 receives the result of processing that is transmitted from the server device 21. If the result of processing includes a request to the device 13, the front end module 41 outputs the corresponding request to the agent module 42.

The agent module 42 of the control unit 31 transmits the request to the device 13, and receives a response from the device 13. Also, the agent module 42 outputs the response to the front end module 41. The front end module 41 transmits the corresponding response to the connected server device 21 through the external network 20. If the server device 21 performs a process for the corresponding response and transmits the result of processing, the front module 41 of the control unit 31 receives the result of processing for the corresponding response, and generates information to be output to the user side device 12 based on the received result of processing. The contents of the detailed processing of the control unit 31 will be described later.

The storage unit 32 maintains a program that is executed by the control unit 31. This program, for example, is stored in a computer readable recording medium such as a DVD-ROM (Digital Versatile Disc Read Only Memory), and is provided and copied to the storage unit 32. Also, the storage unit 32 operates as a working memory of the control unit 31.

The communication unit 33 is connected to a communication unit such as a network. The communication unit according to this exemplary embodiment is connected to the internal network 10 and the external network 20, respectively, exchanges information with the device 13 or the like, which is connected to the internal network 10, through the internal network 10, and exchanges information with the server device 21 through the external network 20.

The user side device 12 is a personal computer or the like, in which a web browser operates, transmits the request to the information processing apparatus 11 in accordance with a user's instruction, and receives information that is transmitted from the information processing apparatus 11 to output the corresponding information to a display or the like for its display. The information processing apparatus 11 and the user side device 12 may be configured as the same device. In this case, application software, which can transmit the request, receive transmitted information, and perform display or input of the received information between the front end module 41 and the agent module 42 of the information processing apparatus 11, may be installed in the information processing apparatus 11. The device 13 is a device to be controlled such as a printer, and receives the request input from the information processing apparatus 11, performs a process according to the corresponding request, and outputs a response to the request.

The server device 21 functions as a control device in this exemplary embodiment. Specifically, the server device 21 controls the device 13 that is protected by a firewall or the like from the external network 20, and in this exemplary embodiment, the information processing apparatus 11 makes such a process possible.

Specifically, if the request, which is received by the information processing apparatus 11 from the user side device 12, is received, the server device 21 issues a session identifier (communication identifier), and executes a predetermined process in relation to the corresponding request. This process is predetermined in accordance with the kind of requests, such as a request to the effect that it is necessary to generate a list view of the device 13, a request to the effect that it is necessary to form an image with respect to the device 13, and the like, and a program that prescribes the corresponding process is maintained in the server device 21.

As an example, in the case of receiving a request to the effect that it is necessary to generate a list view of the device 13, the server device 21 starts a process of reading a program (a list view generation program) that is stored in relation to the corresponding request. In the server device 21, the processes being executed are identified by respective inherent process identification information. The server device stores the session identifier previously issued and the process identifier for identifying the process that starts according to the request for the corresponding session identifier in relation to each other.

The server device 21 describes information that includes a list view of information that specifies the device 13, which is maintained in advance on the side of the server device 21 in relation to information (for example, a network address or the like of the information processing apparatus 11) that specifies the information processing apparatus 11 of a request source using HTML (Hyper Text Markup Language) in accordance with a list view generation program.

Also, the server device 21 describes a script (status acquisition script) for acquiring respective statuses of the device 13 included in the list view with respect to information described by HTML using a language such as JavaScript® or the like, and sets the script so that the script is executed at the timing of reading the information that is described by the corresponding HTML. For example, in the case of using the JavaScript, this setting may be made by attaching an "onload" attribute to the status acquisition script.

That is, the server device 21 sends a response to the request together with the issued session identifier, as the information described in HTML. In this case, if there is a process to be performed with respect to the side of the device 13, the server device 21 describes the contents of the corresponding process in a script language such as the JavaScript, and sets the process so that the process is executed at the timing of reading the information described in the corresponding HTML, such as by setting the "onload" attribute.

Also, if the server device 21 acquires information that includes a response from the device 13, as the same session (in the communication using the same session identifier), from the information processing apparatus 11, it resumes the process that is identified by a process identifier that is stored in relation to the session identifier with reference to the session identifier of the corresponding information.

Here, the server device 21 performs a process using the response from the device 13. Specifically, the server device 21 generates and transmits information that indicates the status of the device 13 and an HTML document which includes a table that corresponds to the network address of the device 13 to the information processing apparatus 11.

In this case, the server device 21 maintains the time when the information related to the corresponding session identifiers is finally received for each session identifier, and performs a process of interrupting the session, such as interrupting the processing that is identified by the corresponding processing identifier, with respect to the session identifiers in which the elapsed time from the corresponding time exceeds a predetermined threshold value, with reference to the process identifiers that are stored in relation to the corresponding session identifiers.

Next, the contents of the processing of the control unit 31 of the information processing apparatus 11 according to this exemplary embodiment will be described. As described above, the control unit 31 includes the front end module 41 and the agent module 42. The front end module 41 and the agent module 42 may be processed as one process, or may be executed as different processes, and perform communication with each other.

Figure 3:
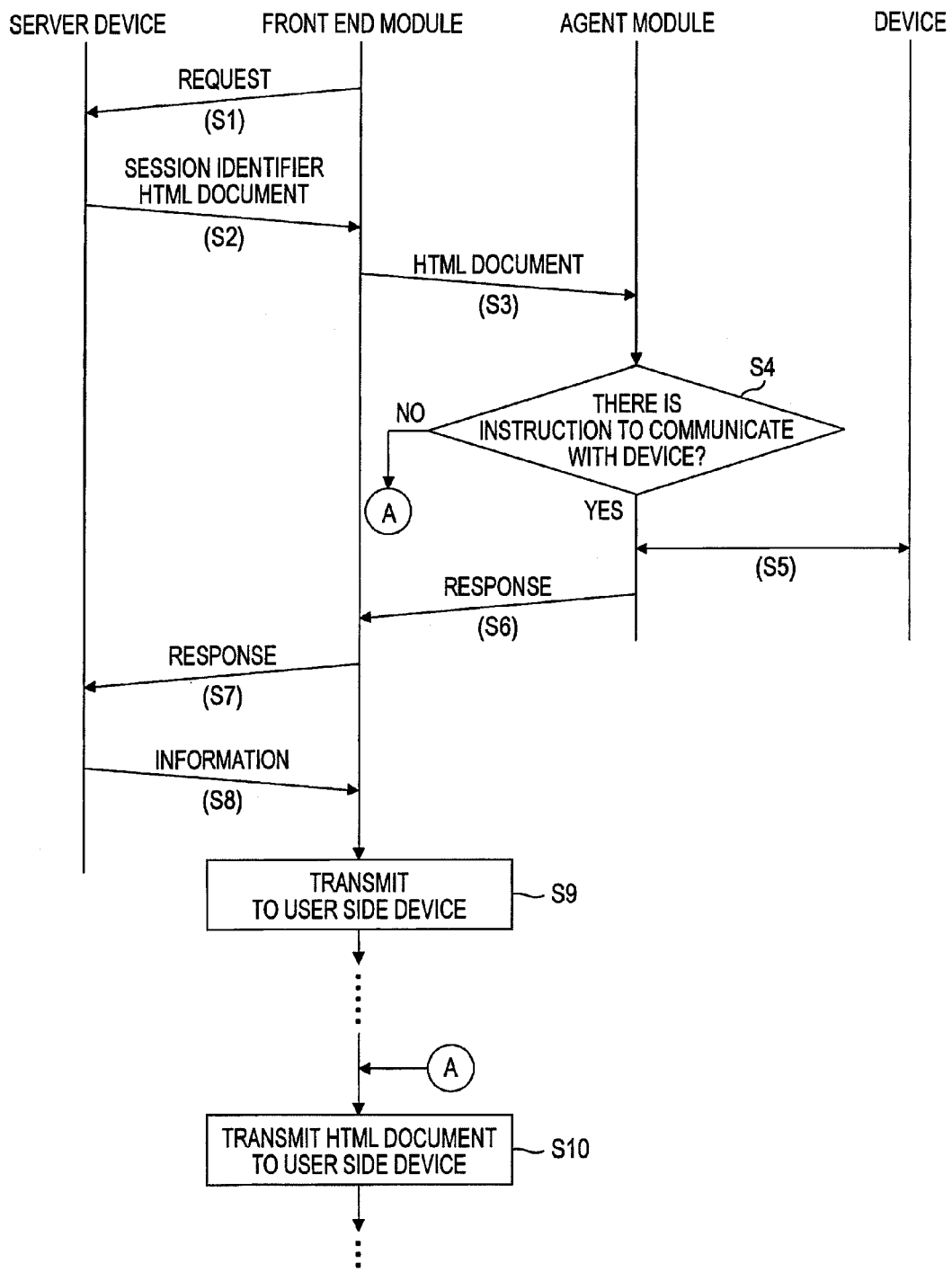
FIG. 3 is a flowchart illustrating an operational example of an information processing apparatus according to an exemplary embodiment of the invention.

The case of processing the front end module 41 and the agent module 42 as one process may be the case where the front end module 41 is a module having a browser function that accesses a web page and the agent module 42 is a so-called plug-in module for the corresponding browser function. In this case, the front end module 41, as exemplified in FIG. 3, sends a request received from the user side device 12 to the server device 21 (S1), and then receives the session identifier and the HTML document (S2). The front end module 41 outputs the HTML document to the agent module 42 (S3).

The agent module 42 investigates whether there is any process (instruction to perform communication with the device 13) to be executed during reading in the HTML document outputted by the front end module 41 (S4). Here, if there is an instruction to perform communication ("Yes"), the agent module 42 performs communication with the device 13 in accordance with the corresponding instruction and receives a response from the device 13 (S5). At this time, if an instruction to perform communication with a plurality of devices 13 is included in the instruction, the agent module 42 performs communication with the plurality of devices 13 in accordance with the corresponding instruction and receives responses from the respective devices 13.

The agent module 42 outputs the response that is obtained from the device 13 to the front end module 41 (S6), and the front end module 41 transmits the response to the server device 21 (S7). The front end module 41 includes the session identifier previously received from the server device 21 in the information that is transmitted.

Also, the front end module 41 receives information from the server device 21 (S8), and performs information presentation based on the information with respect to the user side device 12 (S9). Specifically, the front end module 41 receives the information described by HTML from the server device 21, and transmits the corresponding information to the user side device 12 as the response to the request previously received from the user side device 12.

Also, if there is no instruction to perform the communication in step S4 ("No": A), the agent module 41 instructs the front end module 41 to transmit the HTML document received from the server device 21 to the user side device 12 as it is (S10). Even in this case, the front end module 41, in the same manner as the process in step S9, transmits the HTML document received from the server device 21 to the user side device 12 as the response to the request previously received from the user side device 12.

Figure 4:
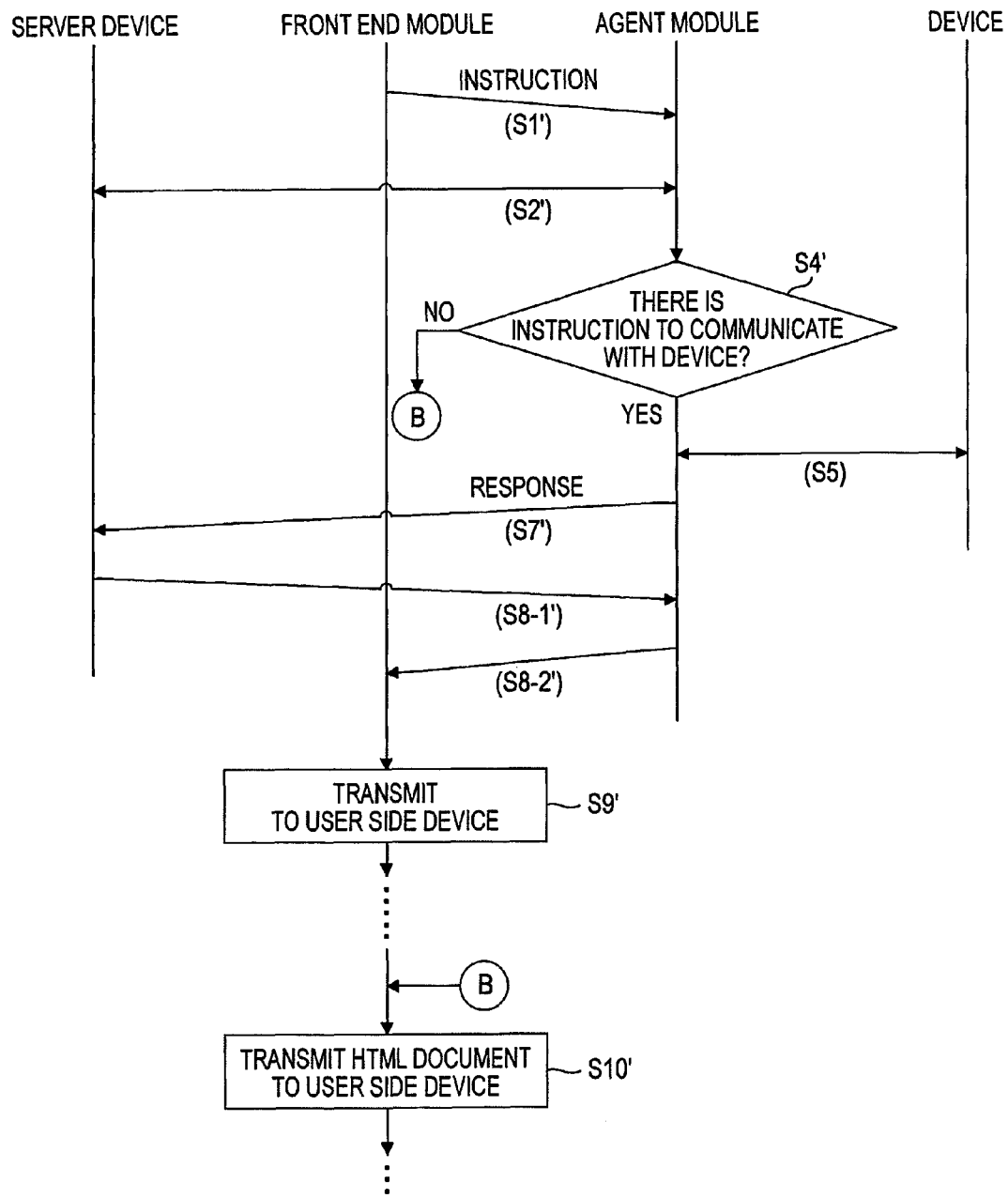
FIG. 4 is a flowchart illustrating another operational example of an information processing apparatus according to an exemplary embodiment of the invention.

Next, a case where the front end module 41 and the agent module 42 are executed as separate processes will be described. In this case, as exemplified in FIG. 4, the front end module instructs the agent module 42 to output the request received from the user side device 12 to the server device 21 (S1'). The agent module 42 transmits the request to the server device 21, and receives the session identifier and the HTML document from the server device 21 (S2').

The agent module 42 investigates whether there is any process (instruction to perform communication with the device 13) to be executed during reading in the HTML document received from the server device 21 (S4'). Here, if there is an instruction to perform communication ("Yes"), the agent module performs communication with the device 13 in accordance with the corresponding instruction and receives a response from the device 13 (S5). At this time, if an instruction to perform communication with a plurality of devices 13 is included in the instruction, the agent module 42 performs communication with the respective devices 13 in accordance with the instruction, and receives responses from the respective devices 13.

The agent module 42 transmits the response that is obtained from the device 13 to the server device 21 (S7'). The agent module 42 includes the session identifier previously received from the server device 21 in the information that is transmitted.

Also, the agent module 42 receives information from the server device 21 (S8-1'), and outputs this information to the front end module 41 (S8-2'). Also, the front end module 41 performs information presentation based on the information input from the agent module 42 with respect to the user side device 12 (S9'). The contents of this process S9' are the same as those in step S9 illustrated in FIG. 3.

Also, if there is no instruction to perform the communication in step S4' ("No": B), the agent module 42 transmits the HTML document received from the server device 21 to the user side device 12 through the front end module 41 (S10'). This process may be the same as the process in step S10 of FIG. 3.

In this exemplary embodiment, the above-described configuration is provided, and hereinafter, examples of performing (a) a process of providing a view of a printer as the device 13, (b) a process of forming an image on a printer as the device 13, and (c) a process of changing the setting of the device 13 by making the server device 21 function as a control device will be described in detail. Here, although it is exemplified that the device 13 is a printer, any device (image forming device) having a function of performing an image forming, such as a multifunction device having functions of a scanner and the like, may be adopted.

In the following examples, it is assumed that the server device 21 provides a function of managing a printer that is used in an organization by each organization. For example, a case where a printer maker or the like remotely and collectively manages printers delivered to the organization is exemplified. In these examples, as exemplified in FIG. 5, it is assumed that the server device 21 maintains list view information of printers in advance for each organization (here, in relation to information that specifies the information processing apparatus 11). Here, the list view information of printers may be information that includes a name of an appliance, a network address (address on the internal network 10), and a name of a kind of an appliance for each printer. Also, the information that specifies the information processing apparatus 11 may be a network address (address on the external network 20) of the information processing apparatus 11.

(a) Process of Providing a Printer List View

A user of the user side device 12 sends a request for printer list view to the information processing apparatus 11. This request may be, for example, a URL (Uniform Resource Locator) that indicates a program of printer list view generation in the information processing apparatus 11. When the information processing apparatus 11 receives the request for the printer list view, it outputs the corresponding request to the server device 21.

The server device 21 issues a session identifier. Also, the server device 21 reads and starts the processing of the program (list view generation program) that is stored in relation to the corresponding request. The server device 21 stores the previously issued session identifier and the process identifier that identifies the starting process.

The server device 21 describes the list view information of the printer that is previously maintained on the side of the server device 21 in relation to the information that specifies the information processing apparatus 11 of the request source using the HTML (Hyper Text Markup Language), includes description of the script (status acquisition script) for acquiring the statuses of the printers included in the list view using a language such as the JavaScript or the like in the information described in the HTML (HTML document), and sets the script so that the script is executed at the timing of reading the information described by the corresponding HTML to respond to the information processing apparatus 11 of the request source. Specifically, the "onload" attribute is attached to the status acquisition script.

The information processing apparatus 11 receives the session identifier and the HTML document, and investigates whether there is a process to be executed during reading (instruction to communicate with the printer) in the HTML document. Here, since the process to which the "onload" attribute is attached (the script that includes the instruction to the effect that it is necessary to communicate with the device 13) exists, the information processing apparatus 11 performs communication with the respective printers included in the list view in accordance with the instruction and receives responses from the respective printers.

The information processing apparatus 11 transmits the response obtained from the printer to the server device 21. In this case, the session identifier that is received from the server device 21 is included in the information that is transmitted.

The server device 21 receives the response from the printer and the session identifier, and resumes the process that is identified by the process identifier that is stored in relation to the session identifier. Here, the server device 21 generates a table in which the printer list view information and the information that indicates the statuses of the respective printers are arranged in relation to each other, and generates and transmits the HTML document that includes the corresponding table to the information processing apparatus 11.

The information processing apparatus 11 receives the HTML document from the server device 21, and transmits the received HTML document to the user side device 12 as a response to the request that is previously received from the user side device 12. Accordingly, the user side device 12 displays the HTML document that includes the table in which the printer list view information and the information S that indicates the statuses of the respective printers are arranged in relation to each other. This display contents, for example, may be those as exemplified in FIG. 6.

(b) Process of Forming an Image in a Printer

Next, an example in which a user requests a process of forming an image to a printer will be described. This request may be, for example, a URL that indicates a program for forming an image in the information processing apparatus 11. It is assumed that the information processing apparatus 11 pre-designates a file that is the subject of image forming to the URL that corresponds to the request, and maintains the HTML document that includes the uploading process in relation to the file. Since examples of the HTML document are widely known, the detailed explanation thereof will be omitted.

The information processing apparatus 11 receives the designation of file from a user in accordance with the instruction described in the HTML document, and if the upload of the designated file is received, it outputs the uploaded file to the server device 21 together with the request for image forming.

The server device 21 issues a session identifier, and reads and starts processing of a program (image forming program) that is stored in relation to the corresponding request. The server device 21 stores the session identifier previously issued and the process identifier for identifying the starting process in relation to each other.

The server device 21 generates image data for forming an image based on the file received from the information processing apparatus 11 in accordance with the image forming program. As an example, if it is assumed that the file is an application file (so-called a DOC file) which is generated by a word processor "Word" that is provided by Microsoft Corporation, the server device 21 converts this application file into a data format that is described in a page description language that can perform printing of application file data through a printer for each page, and generates image data for image forming.

The server device 21 stores the generated image data, acquires the image data from the URL of the storage place of the image data, and generates the HTML document that includes description of the script (data acquisition script) for outputting the acquired image data to the printer using a language such as the JavaScript or the like. In this case, the server device 21 sets the data acquisition script so that the data acquisition script is executed at the timing of reading the HTML document, and responds to the information processing apparatus 11 of the request source. Specifically, here, an "onload" attribute is attached to the data acquisition script.

The information processing apparatus 11 receives the session identifier and the HTML document, and investigates whether there is a process to be executed during reading (instruction to communicate with the printer) in the HTML document. Here, since the process to which the "onload" attribute is attached (the script that includes the instruction to the effect that it is necessary to communicate with the device 13) exists, the information processing apparatus 11 downloads the image data from the designated URL in accordance with the instruction, and transmits and outputs the downloaded image data to the printer. The printer receives the image data transmitted from the information processing apparatus 11. The printer issues a job identifier according to the reception of the image data, and transmits the job identifier to the information processing apparatus 11. The information processing apparatus 11 stores the session identifier and the job identifier transmitted from the printer in relation to each other. Next, the printer performs a printing process by analyzing the image data, and transmits the result of print processing (output completion, abnormality end, or the like) to the information processing apparatus together with the job identifier.

The information processing apparatus 11 acquires the job identifier that is the response from the printer and the result of image forming processing, and transmits the result of image processing to the server device 21 together with the session identifier that corresponds to the job identifier. In this case, the information processing apparatus 11 may delete or maintain the image data previously downloaded to make the reprint thereof possible later. In the case of maintaining the image data, the information processing apparatus may transmit the list view of the maintained image data in accordance with the request from the user side apparatus 12, receive a printing instruction of the image data included in the list view from the user side device 12, and transmit and output the instructed image data to the printer as the device 13 again to perform the image forming.

The server device 21 receives the response from the printer and the session identifier, and resumes the process that is identified by the process identifier that is stored in relation to the session identifier. Here, the server device 21 generates an HTML document that indicates a response from the printer, and transmits the generated HTML document to the information processing apparatus 11.

The information processing apparatus 11 receives the HTML document from the server device 21, and transmits the received HTML document to the user side device 12 as a response to the request that is previously received from the user side device 12. Accordingly, the user side device 12 displays the result of image forming processing.

(c) Process of Changing the Setting of a Device 13

An example in which a user of the user side device 12 performs a request for changing the setting of the printer as the device 13 will be described. In this example, the user transmits the request for changing the setting to the information processing apparatus 11. This request, for example, is transmitted as a URL that indicates a program of setting change in the information processing apparatus 11. When the information processing apparatus 11 receives the request (receives an access to the URL), it transmits a web page that is previously maintained in relation to the corresponding URL to the user side device 12.

This web page includes a section for inputting the designation of a printer and an interface for displaying the various kinds of the settings and receiving the change of the various kinds of the settings (FIG. 7). Specifically, in an example of FIG. 7, the web page includes a title of a printer or a network address (address on the internal network 10) as an essential input section. Also, the web page includes setting X of whether to acquire information such as a name of a kind of an appliance from the device.

Here, if a user performs the setting for acquiring information such as a name of a kind of an appliance from the device, inputs information that is necessary to specify the printer that is the subject of processing, such as the name of the printer which is the subject, and instructs to submit the form inside the web page, the information processing apparatus 11 receives the contents of this form, and outputs a request for starting the setting change to the server device 21.

Here, the information processing apparatus 11 includes a request to the effect that it is necessary to acquire the information such as the name of the kind of appliance or the like from the device in the request for starting the setting change.

The server device 21 receives the request, and issues a session identifier, reads and starts the processing of the program (setting change start program) that is stored in relation to the corresponding request. The server device 21 stores the previously issued session identifier and the process identifier for identifying the starting process in relation to each other.

The server device 21 describes the HTML (Hyper Text Markup Language) that includes printer information that is related to the request, with reference to the printer information related to the request, from the list view information of the printer that is previously maintained in advance on the side of the server device 21 in relation to the information that specifies the information processing apparatus 11 of the request source in accordance with the setting change start program, includes description of the script (setting acquisition script) for acquiring the current setting contents of the printer related to the request with respect to the information described by the HTML (HTML document) using the language such as JavaScript, and sets the script so that the script is executed at the timing of reading the information described by the corresponding HTML to respond to the information processing apparatus 11 of the request source. Specifically, the "onload" attribute is attached to the status acquisition script.

The information processing apparatus 11 receives the session identifier and the HTML document, and investigates whether there is a process to be executed during reading (instruction to communicate with the printer) in the HTML document. Here, since the process to which the "onload" attribute is attached (the script that includes the instruction to the effect that it is necessary to communicate with the device 13) exists, the information processing apparatus 11 performs communication with the designated printer in accordance with the instruction, and receives a response from the corresponding printer. Here, the information processing apparatus 11 requests the current setting contents from the designated printer, and receives information that indicates the current setting contents as a response.

The information processing apparatus 11 transmits the response obtained from the printer to the server device 21. In this case, the session identifier that is previously received from the server device 21 is included in the information that is transmitted.

The server device 21 receives the response from the printer and the session identifier, and resumes the process that is identified by the process identifier that is stored in relation to the session identifier. Here, the server device 21 generates and transmits the HTML document to the information processing apparatus 11.

The HTML document is, for example, a description of the same screen as the screen exemplified in FIG. 7, and includes information, (such as the name of the kind of appliance), that is requested by a user to acquire from the printer and information that indicates the current setting contents (FIG. 7).

The information processing apparatus 11 receives the HTML document from the server device 21, and transmits the received HTML document to the user side device 12 as a response to the request that is previously received from the user side device 12. Accordingly, the user side device 12 displays the HTML document that includes the information that indicates the current setting contents of the printer.

Next, if a user inputs a setting that is different from the current setting contents and instructs to submit the input completion form in the HTML document, the information processing apparatus 11 receives the contents of this form and outputs a request for setting change to the server device 21. Here, the information processing apparatus 11 includes the contents of the form received from the user side device 12 in the request for setting change.

The server device 21 receives the request, and issues a session identifier, reads and starts the processing of the program (setting change program) that is stored in relation to the corresponding request. The server device 21 stores the previously issued session identifier and the process identifier for identifying the starting process in relation to each other.

The server device 21 transmits the setting contents after change, that is received as the contents of the form, to the printer related to the request in accordance with the setting change program, generates the HTML document that includes the description described using a language such as the JavaScript (setting change script) including the instruction to the effect that is necessary to update the setting of the printer (for example, which may be performed using an SNMP (Simple Network Management Protocol), and sets the script so that the script is executed at the timing of reading the information described by the corresponding HTML to respond to the information processing apparatus 11 of the request source. Specifically, the "onload" attribute is attached to the status acquisition script.

The information processing apparatus 11 receives the session identifier and the HTML document, and investigates whether there is a process to be executed during reading (instruction to communicate with the printer) in the HTML document. Here, since the process to which the "onload" attribute is attached (the script that includes the instruction to the effect that it is necessary to communicate with the device 13) exists, the information processing apparatus 11 transfers the setting contents designated by the user with respect to the printer by performing communication with the designated printer in accordance with the instruction, and transmits the instruction to change the setting. Also, the information processing apparatus 11 receives a response from the corresponding printer. This response becomes a response to the setting change instruction in the printer.

The information processing apparatus 11 transmits the response obtained from the printer to the server device 21. In this case, the session identifier that is received from the server device 21 is included in the information that is transmitted.

The server device 21 receives the response from the printer and the session identifier, and resumes the process that is identified by the process identifier that is stored in relation to the session identifier. Here, the server device 21 generates and transmits the HTML document, in which the printer list view information includes the information on the responses of the respective printers with respect to the setting change instruction, to the information processing apparatus 11.

The information processing apparatus 11 receives the HTML document from the server device 11, and transmits the received HTML document to the user side device 12 as a response to the request that is previously received from the user side device 12. Accordingly, the user side device 12 displays the HTML document that includes the information that indicates the current setting contents of the printer.

Also, in the processing examples, it is assumed that a session timeout does not occur in the server device 21 while the information processing apparatus 11 communicates with the device 13 (printer or the like) in accordance with the script that is included in the HTML document received from the server device 21, receives a response from the device 13, and transmits the response to the server device 21. However, if there is a possibility that the session timeout occurs, the information processing apparatus 11, for example, in the case where it is necessary to transmit the responses from the plurality of devices 13 to the server device 21, may store the responses from the respective devices 13, transmit and output the responses received up to the time to the server device 21 before the session timeout occurs (which may be determined by calculating the time after receiving the HTML document from the server device 21). As described above, by transmitting the information to be transmitted by parts before the timing of the session timeout after the last transmission of the information to the server device 21, the occurrence of the session timeout may be prevented.

Instead of using the HTML document as described above, any document capable of including another script program may be used. In this case, the firewall is set so as to relay the corresponding document, which is transmitted by the server device 21 in accordance with the request from the information processing apparatus 11, from the external network 20 to the internal network 10.

As described above, according to this exemplary embodiment, it is possible to control the device on the internal network that is protected by a firewall or the like using the service on the external network.

The foregoing description of the exemplary embodiment of the present invention has been provided for the purpose of illustration and description. It is not intended to be exhaustive or to limit the invention to the precise forms disclosed. Obviously, many modifications and various will be apparent to practitioners skilled in the art. The embodiments were chosen and described in order to best explain the principles of the invention and its practical application, thereby enabling other skilled in the art to understand the invention for various embodiments and with the various modifications as are suited to the particular use contemplated. It is intended that the scope of the invention be defined by the following claims and their equivalents.

DESCRIPTION OF REFERENCE NUMERALS AND SIGNS

10: internal network
11: information processing apparatus
12: user side device
13: device
20: external network
21: server device
31: control unit
32: storage unit
33: communication unit
41: front end module
42: agent module

What is claimed is:

1. An information processing system comprising:
a control device;
an information processing apparatus that is connected to the control device through a communication unit that permits a given limited communication; and
a control target device that is connected to the information processing apparatus,
wherein the control device includes a first unit that receives a first request from the information processing apparatus and transmits a first result of a first processing about the first request to the information processing apparatus, and
wherein the information processing apparatus includes:
a second unit that accepts the first request, transmits the first request to the control device, and receives the first result from the control device; and
a third unit that determines whether the received first result includes an instruction to request the control target device to perform a processing, and in response to determining that the first result includes the instruction to request the control target device to perform the processing, requests the control target device to perform the processing,
wherein the first request includes a request for an image forming processing,
wherein the first result includes:
an instruction for the image forming processing to the control target device;
a session identifier; and
an HTML document,
wherein, in response to receiving the first result, the information processing apparatus retrieves image data using the HTML document and outputs the image data to the control target device,
wherein, in response to receiving the output image data, the control target device performs the image forming processing, issues a job identifier, and transmits a result of the image forming processing and the job identifier to the information processing apparatus,
wherein the information processing apparatus stores the session identifier and the job identifier in relation to each other, and
wherein the information processing apparatus transmits, to the control device, the result of the image forming processing together with the session identifier that corresponds to the job identifier.

2. The information processing system according to claim 1, wherein the control device includes a fourth unit that accepts a response based on a result of the processing on the control target device and transmits a second result which is a result of a second processing based on the response to the information processing apparatus,
wherein the information processing apparatus includes:
a fifth unit that accepts the response based on the result of the processing at the control target device from the control target device;
a sixth unit that transmits the response based on the response accepted by the fifth unit to the control device and accepts the result of the second processing from the control device; and
a seventh unit that output the result of the second processing.

3. The information processing system according to claim 2, wherein the first result includes an instruction for requesting the control target device to perform a processing to obtain a condition of the control target device,
 wherein the response includes information indicating a condition obtained from the control target device, and
 wherein the second result includes information for displaying a condition of the control target device.

4. The information processing system according to claim 3, wherein the first request includes a request for obtaining information regarding a view of the target device, and
 wherein the second result includes information for displaying a view of the control target device including information indicating the condition of the control target device.

5. The information processing system according claim 2, wherein the response includes a result of the image forming at the control target device, and
 wherein the second result includes information for displaying a result of the image forming.

6. An information processing apparatus comprising:
 a first communication unit that performs communication, through a communication unit that permits a given limited communication, with a control device which receives a first request from the information processing apparatus and which transmits a first result of a first processing about the first request to the information processing apparatus;
 a second unit that accepts the first request, transmits the first request to the control device, and receives the first result from the control device;
 a second communication unit that performs communication with the control device; and
 a third unit that determines whether the received first result includes an instruction to request a control target device to perform a processing, and in response to determining that the first result includes the instruction to request the control target device to perform the processing, requests the control target device to perform the processing,
 wherein the first request includes a request for an image forming processing,
 wherein the first result includes:
  an instruction for the image forming processing to the control target device
  a session identifier; and
  an HTML document,
 wherein, in response to receiving the first result, the information processing apparatus retrieves image data using the HTML document and outputs the image data to the control target device,
 wherein, in response to receiving the output image data, the control target device performs the image forming processing, issues a job identifier, and transmits a result of the image forming processing and the job identifier to the information processing apparatus,
 wherein the information processing apparatus stores the session identifier and the job identifier in relation to each other, and
  wherein the information processing apparatus transmits, to the control device, the result of the image forming processing together with the session identifier that corresponds to the job identifier.

7. The information processing apparatus according to claim 6 further comprising:
 a fifth unit that accepts the response based on the result of the processing at the control target device from the control target device;
 a sixth unit that transmits the response based on the response accepted by the fifth unit to the control device and accepts a second result which is a result of a processing corresponding to the response in the control device; and
 a seventh unit that output the second result.

8. The information processing apparatus according to claim 7, wherein the first result includes an instruction for requesting the control target device to perform a processing to obtain a condition of the control target device,
 wherein the response includes information indicating a condition obtained from the control target device, and
 wherein the second result includes information for displaying a condition of the control target device.

9. The information processing apparatus according to claim 8, wherein the first request includes a request for obtaining information regarding a view of the target device, and
 wherein the second result includes information for displaying a view of the control target device including information indicating the condition of the control target device.

10. The information processing apparatus according claim 7,
 wherein the response includes a result of the image forming at the control target device, and
 wherein the second result includes information for displaying a result of the image forming.

11. A non-transitory computer readable medium storing a program causing a computer connected to a control device and a control target device to execute a process for information processing in an information processing apparatus, the process comprising:
 performing communication, through a communication unit that permits a given limited communication, with a control device which receives a first request from the information processing apparatus and which transmits a first result of a first processing about the first request to the information processing apparatus;
 accepting the first request;
 transmitting the first request to the control device;
 receiving the first result from the control device;
 performing communication with the control device;
 determining whether the received first result includes an instruction to request the control target device to perform a processing; and
 in response to determining that the first result includes the instruction, requesting the control target device to perform the processing,
 wherein the first request includes a request for an image forming processing,
 wherein the first result includes:
  an instruction for the image forming processing to the control target device,
  a session identifier; and
  an HTML document,
 wherein the process further comprises, in response to receiving the first result, retrieving image data using the HTML document and outputting the image data to the control target device,
 wherein, in response to receiving the output image data, the control target device performs the image forming processing, issues job identifier, and transmits a result of the image forming processing and the job identifier to the information processing apparatus,
 wherein the process further comprises:
  storing, by the information processing apparatus, the session identifier and the job identifier in relation to each other; and transmitting, by the information processing apparatus, to the control device, the result of the image forming processing together with the session identifier that corresponds to the job identifier.

12. The computer readable medium according to claim 11, the process further comprising:
accepting a response to the requesting step from the control target device;
transmitting a second request to the target control device based on the response accepted by the accepting step;
accepting a second result which is a result of a processing corresponding to the response from the control device; and
outputting the second result.

13. The computer readable medium according to claim 12, wherein the first result includes an instruction for requesting the control target device to perform a processing to obtain a condition of the control target device,
wherein the response includes information indicating a condition obtained from the control target device, and
wherein the second result includes information for displaying a condition of the control target device.

14. The computer readable medium according to claim 13, wherein the first request includes a request for obtaining information regarding a view of the target device, and
wherein the second result includes information for displaying a view of the control target device including information indicating the condition of the control target device.

15. The computer readable medium according claim 12, wherein the response includes a result of the image forming at the control target device, and
wherein the second result includes information for displaying a result of the image forming.

* * * * *